No. 764,114. PATENTED JULY 5, 1904.
C. Y. DAVIDSON.
AGRICULTURAL DISK SHARPENER.
APPLICATION FILED FEB. 15, 1904.
NO MODEL. 2 SHEETS—SHEET 1.
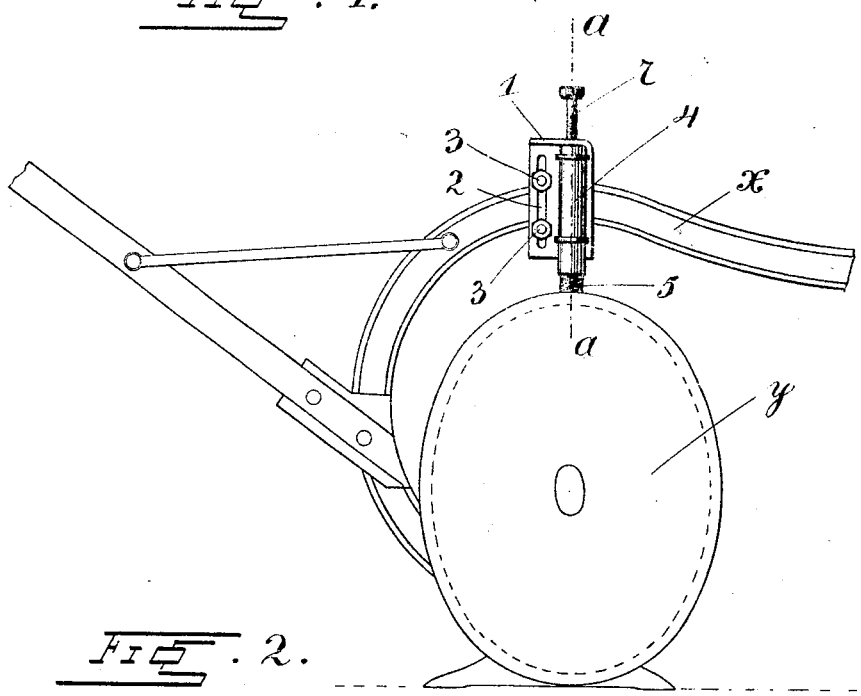
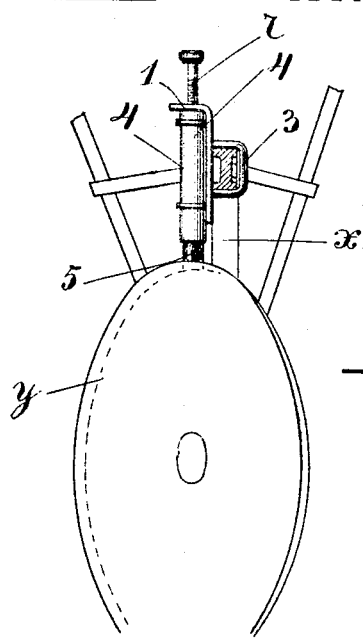
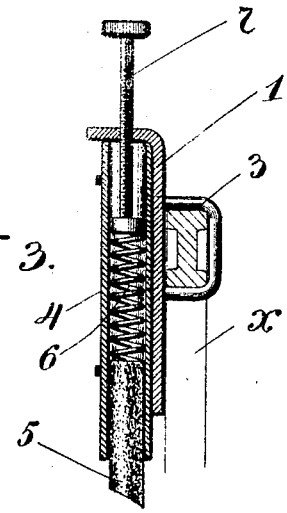
Witnesses
C. Munker
C. Willson
Inventor
C. Y. Davidson
By H. B. Willson
Attorney No. 764,114. PATENTED JULY 5, 1904.
C. Y. DAVIDSON.
AGRICULTURAL DISK SHARPENER.
APPLICATION FILED FEB. 15, 1904.
NO MODEL. 2 SHEETS—SHEET 2.
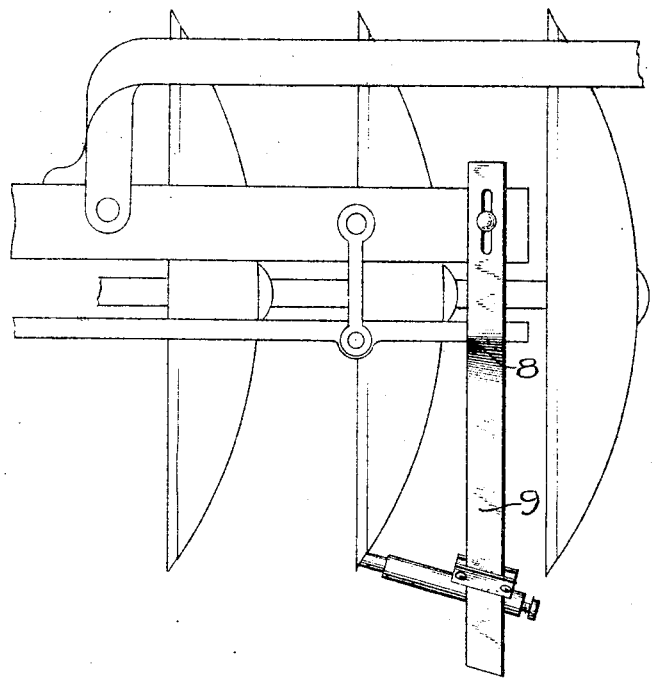
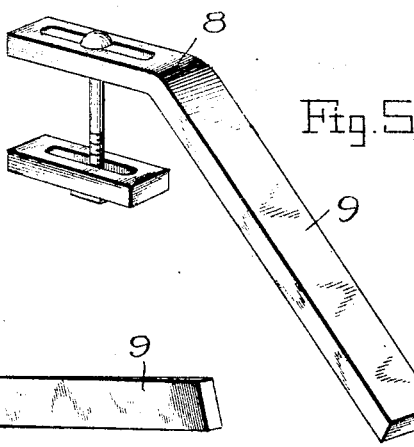

No. 764,114.

Patented July 5, 1904.

UNITED STATES PATENT OFFICE.

COMMODORE Y. DAVIDSON, OF MEDFORD, OKLAHOMA TERRITORY.

AGRICULTURAL DISK-SHARPENER.

SPECIFICATION forming part of Letters Patent No. 764,114, dated July 5, 1904.

Application filed February 15, 1904. Serial No. 193,736. (No model.)

*To all whom it may concern:*

Be it known that I, COMMODORE Y. DAVIDSON, a citizen of the United states, residing at Medford, in the county of Grant and Territory of Oklahoma, have invented certain new and useful Improvements in Agricultural Disk-Sharpeners; and I do declare the following to be a full, clear, and exact description of the invention, such as will enable others skilled in the art to which it appertains to make and use the same.

My invention is an improved disk-sharpener for sharpening the disks of plows, harrows, cultivators, and other agricultural implements; and it consists in the construction, combination, and arrangement of devices hereinafter described and claimed.

The object of my invention is to provide an improved device of this character which is adapted to be readily attached to and adjusted with relation to the beam of a disk plow or to the frame of a disk harrow, cultivator, or other implement and to carry an abrading element—such as a bar of emery, corundum, or a suitable stone or other device—and for pressing the same against the edge of the disk, so that the latter will be sharpened by the rotation of the disk when the implement is in operation, a furthur object being to provide means for regulating the pressure of the abrading element against the edge of the disk.

In the accompanying drawings, Figure 1 is an elevation of a disk-sharpener embodying my improvements, showing the same attached to the beam of a disk plow and disposed in position to sharpen the edge of the disk. Fig. 2 is an elevation at right angles to Fig. 1, and Fig. 3 is a sectional view taken on the plane indicated by the line *a a* of Fig. 2. Fig. 4 is an elevation showing my improved disk-sharpener in operative position on a disk harrow. Figs. 5 and 6 are detail views of the angle-arm for attaching the disk-sharpener to a disk harrow or cultivator.

In the embodiment of my invention I provide a bracket 1, which is preferably of the form here shown and has a longitudinal slot 2. A clip-bolt 3 or other suitable device passes through the slot and is adjustable therein and serves to secure the bracket to the beam of a disk plow, as shown in Fig. 1, the beam being indicated at *x* and the disk of the plow being indicated at *y*. On the bracket is a cylindrical barrel 4 of suitable length, in the the lower portion of which the abrading element 5, which is preferably of cylindrical form, is placed, and the said abrading element is longitudinally movable in the said barrel. A coiled spring 6 is placed in the barrel and adapted to bear against the inner end of the abrading element, and the barrel is further provided with an adjusting-screw 7, which bears against the inner end of the spring and enables the latter to be moved outwardly or inwardly to adjust the abrading element in the barrel. The abrading element bears against the edge of the disk to be sharpened, and the pressure of the same against the edge of the disk may be regulated by means of the screw and the spring, as will be understood. The spring forms a cushion for the abrading element, which is movable in the barrel, and enables the same to move as may be required to conform to any eccentricities or irregularities of the disk, so that under all conditions it exerts the same pressure against all portions of the edge of the disk as the latter rotates.

My invention is not only adapted for use in sharpening the disks of plows, but may be also employed for use on disk harrows, cultivators, and other agricultural devices on which disks are employed. In Fig. 4 I show the same in use on a disk harrow and in connection with an angle-arm 8, on which the bracket is adjustably and detachably secured, the angle-arm being adjustably and detachably secured to the frame of the harrow and serving to support the device in operative relation to any one of the harrow-disks. It will be observed that the longer portion of the angle-arm is laterally oblique, as at 9 in Fig. 5, so that the device is held at the required angle with reference to the disk on which it operates.

From the foregoing description, taken in connection with the accompanying drawings, the construction, operation, and advantages of the invention will be readily understood without requiring a more extended explanation.

Various changes in the form, proportion, and the minor details of construction may be resorted to without departing from the principle or sacrificing any of the advantages of this invention.

Having thus described my invention, what I claim as new, and desire to secure by Letters Patent, is—

1. An agricultural disk-sharpener comprising a supporting element, means to secure the same to an implement of the class indicated, a tubular guide element on the supporting element, an abrading element movable in the guide element, supported thereby and adapted to be projected from the outer end thereof, and means to adjust the abrading element, substantially as described.

2. An agricultural disk-sharpener comprising a supporting element, means to secure the same to an implement of the class indicated, a tubular guide element on the supporting element, a spring in the guide element, an abrading element also in the guide element, bearing against the spring and adapted to be projected from the outer end of the guide element, and means to adjust the abrading element and vary the tension of the spring, the latter cushioning the abrading element, substantially as described.

3. An agricultural disk-sharpener comprising an angle-arm, means to secure the same to an implement of the class described, a supporting element secured to and adjustable on the angle-arm, a tubular guide element on the supporting element, an abrading element movable in the guide element and adapted to be projected from the outer end thereof, and means to adjust the abrading element, substantially as described.

In testimony whereof I have hereunto set my hand in presence of two subscribing witnesses.

COMMODORE Y. DAVIDSON.

Witnesses:
W. F. QUIGLEY,
D. D. STETLER.